US010052506B2

(12) United States Patent
Shaw (10) Patent No.: US 10,052,506 B2
(45) Date of Patent: Aug. 21, 2018

(54) DOUBLE-SIDED-MIRRORED FIRE-BARRIERS

(75) Inventor: Alan Shaw, Lockport, NY (US)

(73) Assignee: InPro Corporation, Muskego, WI (US)

( * ) Notice: Subject to any disclaimer, the term of this patent is extended or adjusted under 35 U.S.C. 154(b) by 1300 days.

(21) Appl. No.: 13/083,569

(22) Filed: Apr. 10, 2011

(65) Prior Publication Data

US 2011/0247840 A1 Oct. 13, 2011

Related U.S. Application Data

(60) Provisional application No. 61/322,403, filed on Apr. 9, 2010.

(51) Int. Cl.
| | |
|---|---|
| *A61C 8/00* | (2006.01) |
| *A62C 2/06* | (2006.01) |
| *B32B 15/14* | (2006.01) |
| *B32B 15/20* | (2006.01) |
| *E04B 1/94* | (2006.01) |
| *B32B 5/02* | (2006.01) |
| *B32B 5/26* | (2006.01) |

(Continued)

(52) U.S. Cl.
CPC ............. *A62C 2/06* (2013.01); *B32B 5/024* (2013.01); *B32B 5/26* (2013.01); *B32B 9/005* (2013.01); *B32B 9/04* (2013.01); *B32B 9/041* (2013.01); *B32B 15/14* (2013.01); *B32B 15/18* (2013.01); *B32B 15/20* (2013.01); *E04B 1/948* (2013.01); *B32B 2262/10* (2013.01); *B32B 2262/101* (2013.01); *B32B 2262/105* (2013.01); *B32B 2307/304* (2013.01); *B32B 2307/3065* (2013.01); *B32B 2307/50* (2013.01); *B32B 2307/702* (2013.01); *B32B 2307/7242* (2013.01); *B32B 2419/00* (2013.01); *B32B 2419/04* (2013.01); *B32B 2571/00* (2013.01); *B32B 2607/00* (2013.01)

(58) Field of Classification Search
CPC ........ B32B 27/08; B32B 27/28; B32B 27/281
USPC ............. 169/48; 428/920, 411, 421; 52/232, 52/396.01, 302.6
See application file for complete search history.

(56) References Cited

U.S. PATENT DOCUMENTS

4,822,659 A * 4/1989 Anderson et al. .............. 428/99
5,460,864 A * 10/1995 Heitkamp ..................... 428/116
(Continued)

*Primary Examiner* — Davis Hwu
(74) *Attorney, Agent, or Firm* — Reinhart Boerner Van Deuren S.C.

(57) ABSTRACT

Two-sided and two-sided mirrored fire barriers having each of their two sides tested, rated, and certified for use in common spaces, such as spaces shared between two rooms are taught. Two-sided barriers require only one barrier and one installation, instead of the two presently needed. Two-sided barriers may have different construction and composition on each side; whereas each side of a mirrored fire barrier is a mirror image of the other. All two-sided barriers include top-mounted, bottom-mounted, and side-mounted barriers, gas and moisture impermeable barriers, and barriers shaped to fit into the expansion joint spaces created when a plurality of expansion joints intersect. The barriers are disposed to various sizes, lengths, widths, and depths, in addition to variations in shape, content, number and composition of layers, materials, and attachment means required to accommodate the variety of sizes and shapes of expansion-joint spaces and the desired rating, in terms of hours.

17 Claims, 6 Drawing Sheets

(51) Int. Cl.
*B32B 9/00* (2006.01)
*B32B 9/04* (2006.01)
*B32B 15/18* (2006.01)

(56) References Cited

U.S. PATENT DOCUMENTS

| | | | | |
|---|---|---|---|---|
| 6,153,668 | A | * | 11/2000 | Gestner et al. ............... 523/179 |
| 6,803,090 | B2 | * | 10/2004 | Castiglione et al. ......... 428/172 |
| 6,951,162 | B1 | * | 10/2005 | Shockey et al. ............. 89/36.11 |
| 7,941,981 | B2 | | 5/2011 | Shaw |
| 8,082,715 | B2 | | 12/2011 | Shaw |
| 8,286,397 | B2 | | 10/2012 | Shaw |
| 8,397,453 | B2 | | 3/2013 | Shaw |
| 8,935,897 | B2 | | 1/2015 | Shaw |

\* cited by examiner

BUILD PROCEDURE FOR 2 HOUR WALL GUARD

| 4a. | Protective Cloth |
|---|---|

| 3a. | Protective Cloth |
|---|---|

| 2a. | Metallic Foil |
|---|---|

| 1a. | Ceramic Blanket |
|---|---|

MP

| 1b. | Ceramic Blanket |
|---|---|

| 2b. | Metallic Foil |
|---|---|

| 3b. | Protective Cloth |
|---|---|

| 4b. | Protective Cloth |
|---|---|

FIG. 1A

BUILD PROCEDURE FOR 3 HOUR WALL GUARD

| | |
|---|---|
| 5a. | Protective Cloth |

| | |
|---|---|
| 4a. | Protective Cloth |

| | |
|---|---|
| 3a. | Metallic Foil |

| | |
|---|---|
| 2a. | Ceramic Blanket |

| | | |
|---|---|---|
| 1a. | Ceramic Blanket | MP |
| 1b. | | |

| | |
|---|---|
| 2b. | Ceramic Blanket |

| | |
|---|---|
| 3b. | Metallic Foil |

| | |
|---|---|
| 4b. | Protective Cloth |

| | |
|---|---|
| 5b. | Protective Cloth |

FIG. 1B

BUILD PROCEDURE FOR 4 HOUR WALL GUARD

| | |
|---|---|
| 5a. | Protective Cloth |

| | |
|---|---|
| 4a. | Protective Cloth |

| | |
|---|---|
| 3a. | Metallic Foil |

| | |
|---|---|
| 2a. | Ceramic Blanket |

| | |
|---|---|
| 1a. | Ceramic Blanket |

MP

| | |
|---|---|
| 1b. | Ceramic Blanket |

| | |
|---|---|
| 2b. | Ceramic Blanket |

| | |
|---|---|
| 3b. | Metallic Foil |

| | |
|---|---|
| 4b. | Protective Cloth |

| | |
|---|---|
| 5b. | Protective Cloth |

DOUBLE-SIDED-MIRRORED FIRE-BARRIERS

CROSS-REFERENCE TO RELATED APPLICATIONS

STATEMENT REGARDING FEDERALLY SPONSORED RESEARCH OR DEVELOPMENT

REFERENCE TO SEQUENCE LISTING, A TABLE OR A COMPUTER PROGRAM LISTING COMPACT DISK APPENDIX

Not Applicable

BACKGROUND OF THE INVENTION

The present invention relates generally to fire-barriers and more particularly to tested, rated, and certified mirrored and two-sided fire-barriers for use in expansion-joint spaces between structural units.

The background information discussed below is presented to better illustrate the novelty and usefulness of the present invention. This background information is not admitted prior art. The particular versions of the invention as described below are provided, in part, as illustrative and exemplary, thus, the described versions should not be taken as limiting.

Modern building codes require that stresses experienced by buildings from extreme and/or repetitive changes in temperature, the force of high winds impinging on the building, multi-directional forces due to seismic events, settling of subsoil, building remodels, and excavation on or near the site, for example, be taken into account in the building design. Thus, to accommodate these stresses, buildings now must be constructed with a code-mandated space between adjacent wall, floor, and/or ceiling units. These spaces, referred to as "expansion-joint spaces," allow differential building motions to take place without risking damage to the whole structure.

However, while expansion-joint spaces improve the lifetime integrity of buildings and other structures, they also present a major risk in the event of a fire as the mandated expansion-joint spaces can act as chimney flues providing pathways for gases, flame, and smoke to spread rapidly throughout a structure. To counter the chimney flue effect, building codes for commercial structures require fire-barriers to be installed in the expansion-joint spaces to prevent or to reduce the rate of flames and smoke passing through the joints into adjoining areas. Fire-barriers sometimes referred to as "fire-stops," protect both the building and the inhabitants of the building by extending the time available for inhabitants to leave the building and for fire-fighters to get to the fire.

To be fire barrier functional, fire-barriers are legally mandated to be tested, rated, and certified. There are two currently mandated tests. One measures the ability of a fire-barrier to maintain its structural integrity under compressional and tensional motion, such as the kind of forces a building goes through during an earthquake. This test is referred to as the "cycle" test and its parameters are specified by ASTM 1399. The other test is referred to as the "fire" or "burn" test and its parameters are specified by UL 2079. The two tests are conducted in sequence. A fire-barrier is first cycled between forces of compression and tension 500 times and then, if the barrier passes that test, it is placed into a furnace where it is tested for its ability to resist and prevents flame, heat, and gases from passing through the barrier. Once it passes both tests, the testing agency grants the barrier a Certificate of Listing and the barrier is considered certified.

A different of stress suffered by fire-barriers is exposure to moisture. Once a fire-barrier becomes wet it loses its certification. Drying the barrier does not restore the certification; once the barrier has been wet it is not considered effective. It is difficult, if not impossible, to prevent moisture from reaching barriers. Public facilities such as open stadiums are regularly subjected to the effects of rain and snow as parts of these facilities are frequently, if not always, open to the effects of rain and snow. More enclosed areas are subjected to water and liquids used for cleaning. The integrity of fire-barriers installed in hospitals, schools, sports facilities, hotels, air ports, and high-rise buildings is threatened by copious amounts of water used for cleaning purposes, especially for floor cleaning, on a daily or even more frequent basis. Fire-barrier failure in any facility, especially in facilities with bed-bound occupants, is likely to result in unnecessary hazards to, and even to loss of, life. The importance of correctly designed, installed, tested, and maintained fire-barriers is increasingly recognized by building officials, owners, insurance companies, contractors, and the public.

SUMMARY

The present inventive concept provides for the construction of a two-sided fire barrier for use in extension joint spaces that are common to and between two areas. For example, if two rooms are adjacent but separated by the mandated expansion joint space, a single double-sided fire barrier could be installed negating the need for installing two fire barriers. Adjacent rooms that are separated by a mandated expansion joint space means that each room has a wall facing an adjacent wall of the neighboring room with an extension joint space between the walls. Two-sided fire barriers, according to the inventive concept as taught herein, negates the need to install a fire barrier into the expansion space present in the wall of the first room and then to install another fire barrier into the expansion space that is also present in the adjacent room. The present invention provides for mirrored fire-barriers for use in structural expansion-joint spaces is eliminated. This provides for a savings in material cost, labor, and is more environmentally friendly.

In short, the inventive concept provides for a fire barrier having two functional fire barrier sides. Traditionally, fires barriers have an "outside" surface that is exposed to a fire in the event of a fire, and an "inside" surface that because of the properties of the barrier remains relatively cool. For example, the outside surface, in the barriers discussed herein, comprise a first layer of what is known as a protective cloth, there may be a second layer of the same or another kind of protective cloth, followed by a metallic layer, which is followed by one or more layers of insulation blanket layers. A more detailed description of these materials is provided in the Definitions Section and the Detailed Description Section. Given this example, it is easy to see that such a fire barrier is one-sided with respective to which side must be exposed to the fire of a potential fire event. These barriers are ideal for use, for example, in a floor extension joint, where the barrier is designed to prevent a fire from moving up the flue-like expansion spaces in the floor. This barrier could also be used in an expansion space in a wall unit, but if the wall unit was one wall of two spaced, but adjacent wall units between two rooms, a second one-sided fire barrier would have to be installed in the expansion space that was shared by the two rooms. This is wasteful and now can be avoided by fire barriers built by the principles of the present invention. The fire barriers of the present invention may have each side rated for a different number of hours, such as a barrier having one side rated for two hours and an opposite side rated for three hours. In other words, the sides do not have to be the same, as long as both sides are tested and rated for the intended use. Thus, a fire barrier according to the principles of the present invention can be described as a two-sided fire barrier having each of its two sides defined by a section that includes an outer section between which there is an inner central section common to both of the sections and where each of the two sides fully fire barrier functional, that is the fire barrier is manufactured to have both of its said two sides pass the 2010 listed ASTM 1399 "cycle" test and the UL 2079 "fire" or "burn" test. Furthermore, each of its two outer sections comprises one or more protective cloth layers, said inner central section comprises one or more layers of ceramic insulation blanket, and where each of said two outer sections further comprises one or more layers of metallic foil.

Alternatively, "two-sided" barriers may be constructed to be "mirrored" fire barriers where one side of the two-sided fire barrier is a mirror-image of the other side and both sides of the fire barrier are fully tested, rated, and certified. This construction offers even more in cost, time, and labor reductions. These tested and certified barriers can be installed in any expansion-joint space, but are especially useful when used as mirrored fire-barriers for wall expansion spaces. The term "side" as used herein, refers both to a side surface and to a construct or a section, with each construct consisting of a plurality of individual layer. The context and the illustrations make the distinction clear. When a barrier's side, such as "one side" refers to a construct containing a plurality of layers that are the same in number and kind as the barrier's second or opposite side, it should be recognized that what may be hypothetically considered the backside of one side or construct faces the backside of the other. The imaginary plane between one side and the other side is referred to as a mirror plane as one could describe the two sides as being mirror images of each other. Each layer of the two sides, or sections, is fixedly attached to the other forming a single fire barrier. Mirrored, or two-sided fire barrier construction may be used in fires barriers that require top-mounting, bottom-mounting, or side-mounting. This construction may also be used in barriers that are gas and moisture impermeable on one or on all sides, as well as with barriers that are shaped to fit into the geometrically complex expansion joint spaces that are created when a plurality of expansion joints intersect. Having silicone cloth as the final upper layer, is one example of how to make the barrier moisture impermeable from the top layer down, while having the mirrored fire-barrier completely encapsulated in an impermeable membrane provides for the barrier to be completely moisture and gas impermeable. Thus, the mirrored fire-barriers contemplated by the invention include gas and water impermeable fire-barriers for installation into wall to wall, wall to ceiling, wall to floor, floor to floor, and ceiling to ceiling expansion-joint spaces, as well as in the geometrically complex spaces created when two or more straight-line expansion-joint spaces intersect. Moreover, the barriers may be fitted with a drain and a drainage hose providing for drainage of any water that does collects within the barrier, especially for when the barriers are to be used in floor to floor or floor to ceiling expansion-joint spaces, or any other joint spaces that could be a likely repository for water and or other liquids. Mirrored fire and two-sided barriers according to the inventive concept of the present invention are available in the many styles and sizes required to accommodate the variety of sizes of expansion-joint spaces and to accommodate the desired rating, in terms of hours.

The mirrored or two-sided barriers of the present invention are pre-assembled and delivered to the site ready for one-step, easy, rapid installation by one or at most two installers. Two-sided and mirrored barriers have male and female butt-end connections that prevent any possible leaking from end to end seams. For male/female connecting seams, as well as for seams made up of butt-end to butt-end connections, a butt-cover can be provided to ensure that there is no leakage of any collected fluids except through the drainage system. The seam-butt cover also provides extra protection against the penetration of smoke or fire into the barrier from below the barrier.

The materials used to construct each barrier are fire resistant to degrees that are defined by the tests that the barriers are required to pass before they can be used. These materials are of exceptional strength and are firmly and sturdily attached to the attachment frame which is used in conjunction with the fire-barrier materials to attach the barrier to building units. The fire-barriers of the present invention have passed both the cycle" test specified by ASTM 1399 and the "fire" or "burn" test specified by UL 2079 and ULC S115 on Mar. 31, 2010.

BRIEF DESCRIPTION OF THE DRAWINGS

In order that these and other objects, features, and advantages of the present invention may be more fully comprehended, the invention will now be described, by way of example, with reference to the accompanying drawings, wherein like reference characters indicate like parts throughout the several figures, and in which.

DEFINITIONS

Building units, as used herein, refers to building structures such as walls, floors, ceilings, and the like, and are also referred to as structural units.

Ceramic blanket, as used herein, refers to any material that fits under the definition of insulation blanket given below.

Certification listing is a document against which a field installation is compared to make sure that it complies with a regulation, such as a building code.

Double-sided, as used herein, is a term used to refer to the fire barriers according to the principles of the present invention. The fire-barrier of the present invention is constructed as a single contiguous unit having each side tested, rated, and certified. The first tested, rated, and certified first side may be constructed of different materials, differing number of layers, and differing thickness of layers than that of the barrier's tested, rated, and certified second side. Alternatively, the first and second side may be constructed such that the two sides or sections are mirror images of each other.

Fire barrier, as used herein, are continuous structural construction assemblies, which are designed and constructed to achieve specific fire resistance ratings, limit the spread of heat and fire, and restrict the movement of smoke.

High-temperature thread, as used herein, refers to any thread that is fire-resistant or any thread that will not support combustion, such as a ceramic thread.

Impermeable membrane, as used herein, refers to any material that does not allow the passage of a fluid, such as water, other liquids, and/or gases. The impermeable material discussed herein is a flexible sealing layer used for waterproofing one, more, or all of the layers of a mirrored-fire barrier. Such impermeable blanket layers are made of a variety of materials, such as, but not limited to, silicone, fiberglass fabric coated with silicone rubber, coal tar, bitumen and synthetic polymers that are formed as sheet-like substances of desired sealing properties. Material and substance properties of impermeable membranes used herein meet the requirements of any particular structure, building, authority, climate, chemical and physical environment, required durability, cost effectiveness and the like. Note that the impermeable membranes described herein are not the same as the protective cloths as described herein.

Intumescent, as used herein, refers to those materials having properties that cause them to expand (or intumesce) to several times their original size when activated by high temperatures to prevent the spread of flames and smoke to other parts of a building, for example passive fire-seals contain intumescent compounds. The intumescent occurs in many forms and may be, for example an intumescent layer, strip, or paste, such as a caulking material.

Insulation blanket, as used herein, refers to any number of insulation materials, including fiber blankets made from alumina, zirconia, and silica spun ceramic fibers, fiberglass, and the like and also referred to as ceramic blanket or ceramic insulation blanket.

Interdigitate, as used herein, refers to the verb interlock that is to be interwoven or to commingle.

Interdigitation, as used herein, refers to the act of interlocking or the condition of being interlocked or interpenetrated. As example of interdigitated coupling is a mechanical couple formed using a male/female connection system.

Listing and approval use and compliance, as used herein, is the activity of adhering to all the requirements of installing or using safety-related products and items in conformance with an active certification or approval that has been issued by an organization that is accredited both for testing and product certification, such as those issued by Underwriter Laboratories. In concept, if a safety-related item, such as a fire barrier is used in the same manner as the listing or approval states, and conforming to the intent of the associated testing, then use of the component or system complies with the listing. The listing or test is often cited by a regulation, such as a building code or a fire code, and as such is made law.

Male/female connection system, as used herein, refers to a coupling system where the coupling ends interdigitate.

Metallic layer, as used herein, refers to fire-resistant metal or metallicized foil, such as stainless steel, or the like.

Mirrored, as used herein, refers to an object that has an internal mirror plane.

Mirror image, as used herein, refers to a reflected duplication that appears identical but in reverse. As an optical effect, it results from the reflections of an object from a reflecting surface, such as a mirror, which is referred to as a mirror plane. It is also a concept in geometry and can also be used in a conceptualization process for three-dimensional objects. The concept of mirror image can be extended to three-dimensional objects, including the inside parts, even if they are not visible. The term then relates to structural as well as visual aspects. The mirrored object and the original can also be called an enantiomer or enantiomorph.

Mirror plane, as used herein, refers to an imaginary plane which divides an object into two halves, each of which is the mirror image of the other in this plane. This imaginary plane is also called a plane of symmetry.

Multi-directional, intersection, and/or multi-dimensional architectural expansion join or joint, as used herein refers to any joint space that is formed by the intersection of a plurality of expansion joints. Expansion joints, whether straight-line or intersecting create spaces between building units that act like chimney flues carrying gases, hot air, flame, and smoke throughout a structure.

Multi-directional and/or multi-dimensional fire-resistant barrier, as used herein, refers to any fire-barrier that is shaped to functionally fit into a multi-directional and/or multi-dimensional architectural expansion-joint. Such an expansion joint may also be referred to as the expansion joint that is formed by the intersection of two or more straight-lined expansion joints or as an "intersection joint". Intersection joints may be of any shape but often are in the form of multi-dimensional T-shapes, L-shapes, or cross shapes. The fire barriers according to the present inventive principles that are to be installed into intersection joints mimic the shape of the intersection joint.

Plane of symmetry, as used herein, refers to an object or figure which is indistinguishable from its transformed image is called mirror symmetric Protective cloth, as used herein, refers to a flexible, strong, protective, fire-resistant material that is designed to mechanically support the insulation material and to protect the insulation material from mechanical damage, as the insulation is mechanically weak and can be easily damaged by tearing or ripping either accidentally or intentionally during or after installation thus largely compromising the integrity of the fire-resistant barrier. The fire-resistant layers, such as a layer of insulation material together with a layer of intumescent material, can freely move with respect to the one or more protective layers or they may be attached together via threads or other attaching means. Protective cloths may be manufactured from continuous filament amorphous silica yarns, polymeric material, fiber reinforced polymeric material, high-temperature resistant woven textiles, or a metalized, fiberglass cloth, among others. Metalized cloth may include fibers of stainless steel, aluminum, or copper, for example. Protective materials may also include metal foils or metal screens. Protective cloths also include cloths that are woven to provide for shear, including lateral, motion. Note that protective cloths are not the impermeable membranes that are described herein.

Retainer, as used herein, refers to a means used to attach fire-barriers to building units. For example one top-mount system uses "L" brackets that are first attached to the barrier and then attached to a building unit. Similar, but more complex, brackets are used for mounting the bottom-mount systems according to the principles of the present invention.

Seaming, as used herein, refers to connecting one part to another part, for example where a cloth is folded and the two parts of the cloth that have been brought together by the folding are subsequently "seamed" together along a predetermined line. The seaming may utilize stitching, using an adhesive, stapling, pinning, or any other means that will connect the two parts to each other.

Structural unit, as used herein, refers to such building unit constructs as a wall, floor, ceiling, or the like and may be referred to as building units. These units are often pre-constructed concrete, or of a like material, slabs or panels and can be about 4 inches thick which poses a challenge for the installation of a fire-barrier and the, recently, mandated rubber protective boot.

Tri-dimensional, as used herein, refers to either an expansion-joint that is formed by the intersection of three expansion joints. Such a joint space may also be referred to as a T-shaped expansion-joint as it is made up of three co-joint-arms. T-shaped fire-barriers are constructed and shaped as a contiguous unit to accommodate a T-shaped joint.

Underwriters Laboratories Inc. (UL) is an independent product safety certification organization. Established in 1894, the company UL develops standards and test procedures for products, materials, components, assemblies, tools and equipment, chiefly dealing with product safety. UL also evaluates and certifies the efficiency of a company's business processes through its management system registration programs. UL is one of several companies approved for such testing by the U.S. federal agency Occupational Safety and Health Administration (OSHA). OSHA maintains a list of approved testing laboratories, known as Nationally Recognized Testing Laboratories.

Z-600 cloth, as used herein, refers to any cloth that fits the description of protective cloth given above.

Z-1105 cloth, as used herein, refers to any cloth that fits the description of protective cloth given above.

TESTS:
Fire testing per UL 20 79; Test date: Mar. 31, 2010
Cycle test ASTME 1399 (expansion, compression test); Test date: Mar. 31, 2010
Fire test ULC S115 (Canadian); Test date: Mar. 31, 2010, on Mar. 31, 2010

DETAILED DESCRIPTION

To provide an understanding of the kinds of structure made possible by the inventive concept of the present invention we shall refer to the drawings. In short, the inventive concept provides for "two-sided" and/or "mirrored" fire barriers. In other words, a fire barrier of the principles of the present invention may be constructed so that each side of the barrier is tested, rated, and certified, though not necessarily rated for the same number of hours nor constructed in the same manner or using the same materials. Alternatively, a two-side barrier may be constructed so that one side of the two-sided fire barrier is a mirror-image of the other side. Note that here the term "side" refers to a configuration, with each configuration consisting of a plurality of individual layers. Each side or assembly may contain a plurality of layers that are the same in number and kind as the other side or different. In both cases, however, the hypothetical backside of one side or assembly faces the backside of the other. The imaginary plane between one side and the other side of the two-sided mirrored fire barriers is referred to as a mirror plane, as one could describe the two sides as being mirror images of each other. Although, the structure is described in terms of having two sides, in reality the two assemblies are not individual units, that is, they do not stand alone as each layer is generally fixedly attached to its adjacent layer forming a single unit that is defined as a mirrored or two-sided fire barrier. Mirrored, or two-sided fire barriers, include top-mounted, bottom-mounted, and side-mounted barriers, barriers that are gas and moisture impermeable on one or on all sides, and barriers that are shaped to fit into the geometrically complex expansion joint spaces that are created when a plurality of expansion joints intersect. It should be noted that the disclosed invention is disposed to versions in various sizes, such as lengths, widths, and depths, in addition to variations in shape, content, number and composition of layers, materials, and attachment means. This variation is required to accommodate the variety of sizes of expansion-joint spaces and to accommodate the desired rating, in terms of hours. Therefore, the versions described herein are provided with the understanding that the disclosure provided is intended as illustrative and is not intended to limit the invention to the examples described.

Figure 1A:
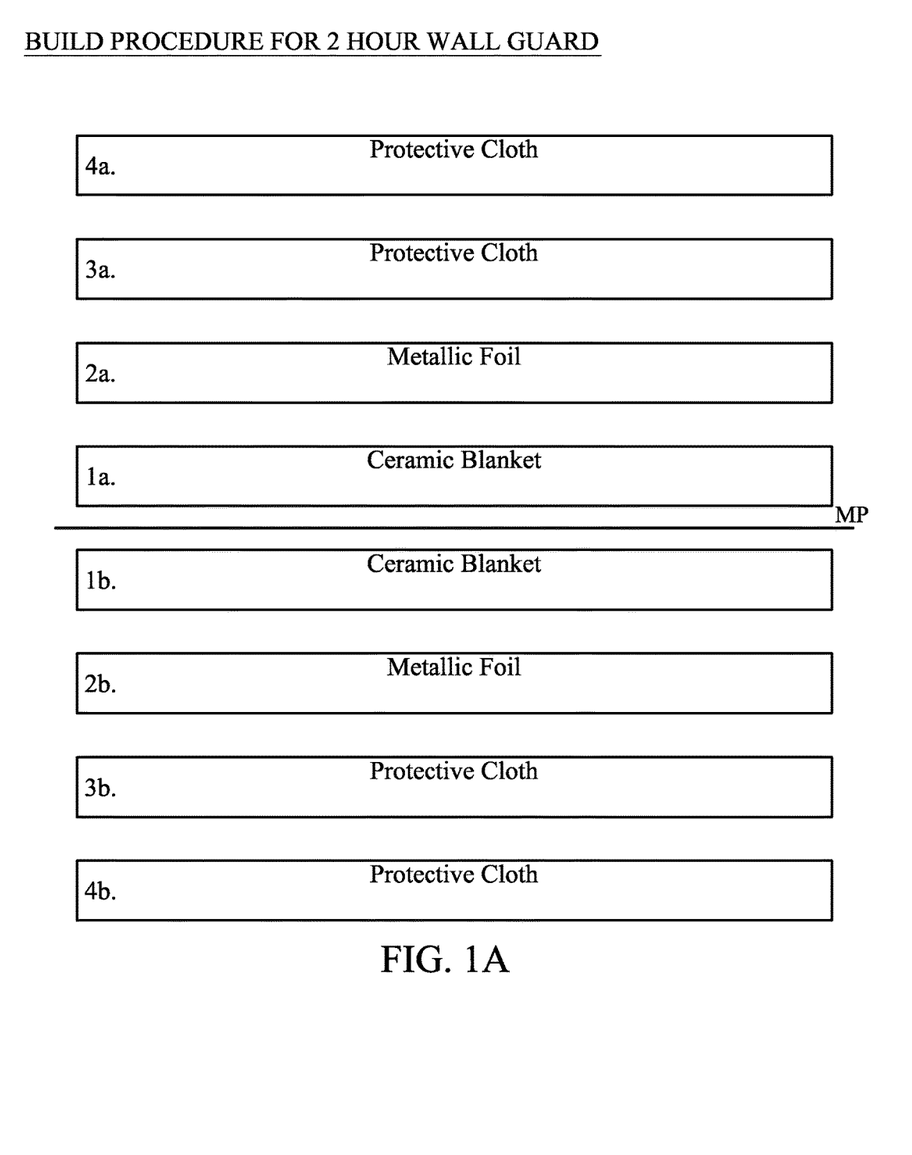
FIG. 1a is a diagrammatic sketch illustrating the construction/structure of a 2-hour mirrored-fire-barrier of the present invention.

FIG. 1a, a diagrammatic sketch, illustrates the structure of a 2-hour rated mirrored-fire-barrier of the present invention and the basics of how it is made. It is to be understood that, although the discussion herein often refers to wall-mount mirrored-fire-barriers, the principles of the invention, can be used to make any multi-directional fire-barriers, as well as the straight-line or planar versions. In this example, the 2-hour rated mirrored-fire-barrier has a mirror plane MP between layers 1a and 1b. As mentioned, the mirror plane is a hypothetical construct. In reality, layers 1a and 1b are in direct contact with each other. In the example provided, each of the ceramic blanket layers is ½ inch thick. It should be understood that the dimensions provided in this example are for a particular style and that the dimensions may be varied as desired. There could be one blanket one inch thick or one ¼ inch thick and one ¾ inch thick. This would create a two-sided barrier as the hypothetical mirror plane would be destroyed. Added to the outer sides of each of the ceramic blanket layers is a sheet of metallic foil (see layers 2a and 2b), which in this example is a sheet of stainless steel. Following each of the stainless steel layers is a layer of protective cloth (see layers 3a and 3b), which in this example is Z-1105 cloth. The outer layer of the multi-layer mirrored fire-barrier comprises another style of protective cloth (see layers 4a and 4b), which in this example is Z-600 protective cloth. Each layer is attached to its adjacent layer. Note that for this particular 2-hour tested and rated mirrored-fire-barrier, there are two layers of ½ inch ceramic blanket to provide for the 1 inch of ceramic blanket that is required for a 2 hour rating. The blankets are cut to have the length and width that are required by the size of expansion joint into which the completed barrier is to be installed and the metallic layers and protective cloth layers are similarly cut.

Figure 1B:
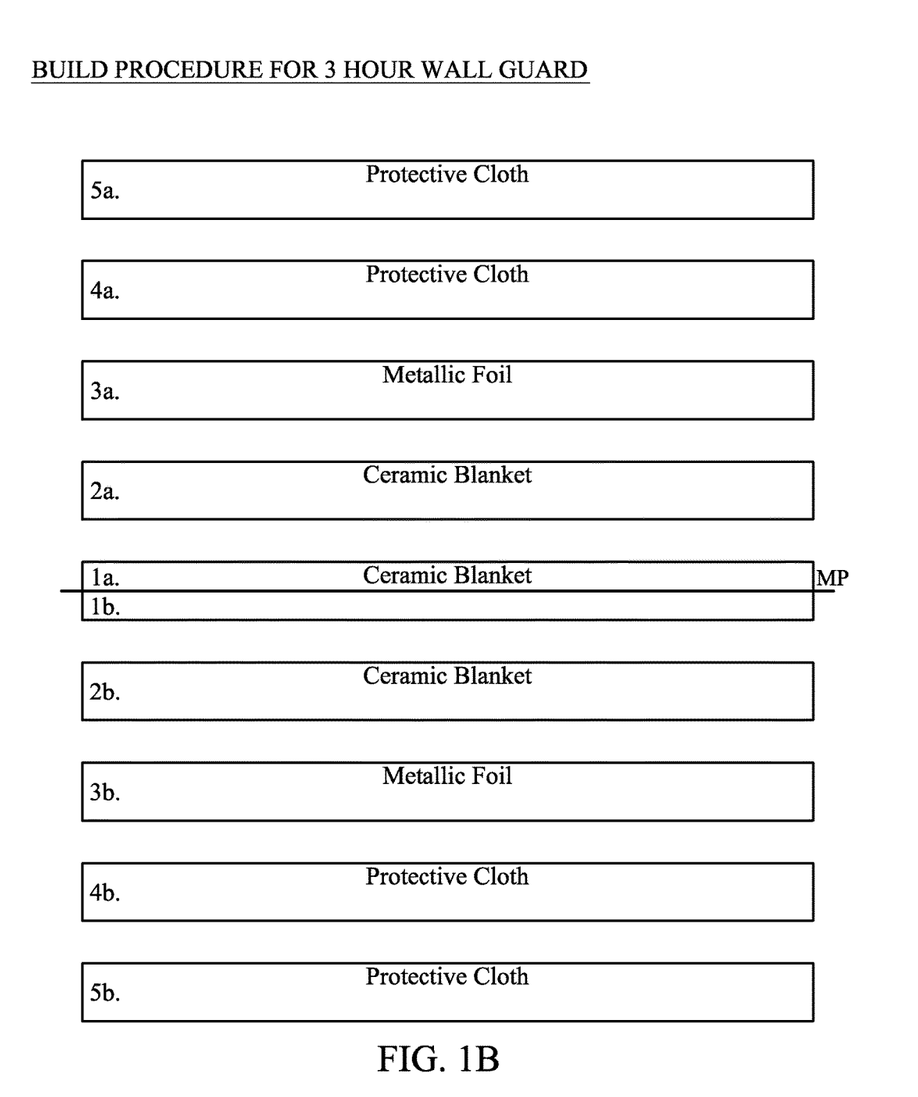
FIG. 1b is a diagrammatic sketch illustrating the construction/structure of a 3-hour mirrored-fire-barrier of the present invention.

FIG. 1b, a diagrammatic sketch, illustrates the structure of a 3-hour mirrored-fire-barrier of the present invention and the basics of how it is made. The structure of the example 3-hour rated mirrored-fire-barrier illustrated, differs in manufacture from the 2-hour rated mirrored-fire-barrier by the addition of a third layer of ½ inch ceramic blanket, illustrated by layers 1, 1*a*, and 1*b*. Note that is this example, the mirror plane MP cuts through the center of layer 1. This barrier could also be constructed to have a one inch layer and a ½ inch layer. This would then be considered a two-sided rather than a mirrored two-sided barrier, but would still possess the same properties including the testing properties. The addition of the metallic foil layer and the protective cloth layers, and the structure and construction follow the same pattern as seen in FIG. 1*a*. So that as in the construction of the 2-hour rated mirrored-fire-barrier, a metallic foil layer (see layers 2*a* and 2*b*) is added to the outer sides of each of the two outer ceramic blanket layers 1*a*, and 1*b*. And again, in this example the metallic foil layer is shown as a stainless steel foil layer. Following each of the stainless steel layers is a layer of protective cloth (see layers 3*a* and 3*b*) and it this example, this layer of protective cloth is Z-1105 cloth. The outermost layers (see layers 4*a* and 4*b*) of the example 3 hour rated multi-layer mirrored fire-barrier comprises Z-600 protective cloth. Note that for this particular 3-hour tested and rated mirrored-fire-barrier, there must be three layers of ½ inch ceramic blanket or a total of 1½ inches of ceramic blanket. The blankets are cut to have the length and width that are required by the size of expansion joint into which the completed barrier is to be installed and the metallic layers and protective cloth layers are similarly cut.

Figure 1C:
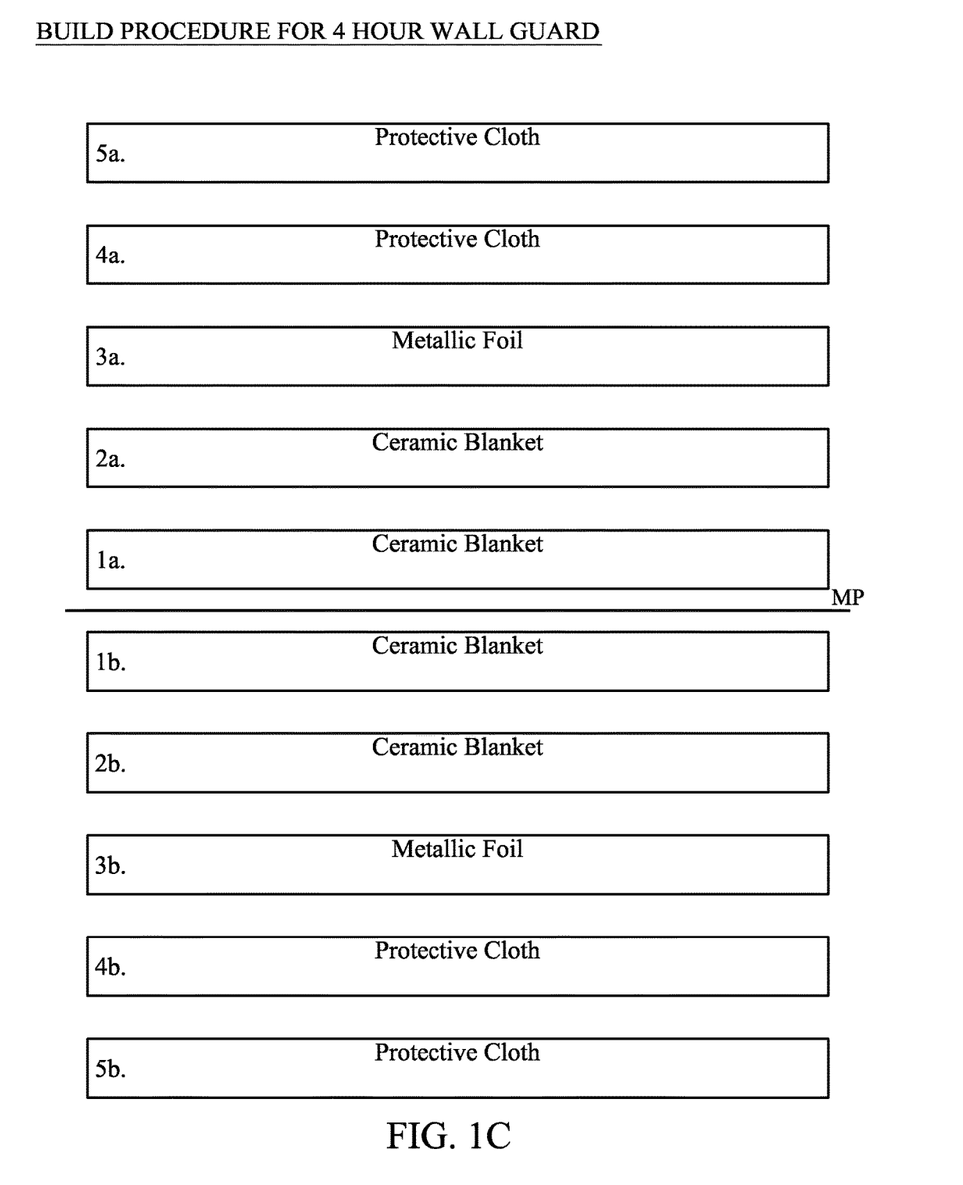
FIG. 1c is a diagrammatic sketch illustrating the construction/structure of a 4-hour tested and rated mirrored-fire-barrier of the present invention.

FIG. 1*c*, a diagrammatic sketch, illustrates the structure of a 4-hour mirrored-fire-barrier of the present invention and the basics of how it is made. The structure of the example 4-hour mirrored-fire-barrier illustrated differs in manufacture from the 3-hour mirrored-fire-barrier by the addition of a fourth layer of ½ inch ceramic blanket, illustrated by layers 1*a*, 1*b*, 2*a*, and 2*b*. Again, the thickness of the ceramic blanket layers could be such that the there was no hypothetical mirror plane, but the overall properties of the barrier would not differ. Note that in this example, the mirror plane MP is located in the between the layers 1*a*, and 1*b*. Otherwise the structure and construction can be compared to the 2 and 3 hour rated barriers. As for the 3-hour mirrored-fire-barrier, added to the outer sides of each of the two outer ceramic blanket layers 2*a*, and 2*b* are stainless steel foil layers (see layers 3*a* and 3*b*. Following each of the stainless steel layers is a layer of Z-1105 cloth (see layers 4*a* and 4*b*). The outer most layers of the multi-layer 4 hour rated mirrored fire-barrier comprises Z-600 protective cloth, (see layers 5*a* and 5*b*). Note that for this particular 4-hour tested and rated mirrored-fire-barrier, there must be four layers of ½ inch ceramic insulation blanket or a total of 2 inches of ceramic insulation blanket.

Figure 2:
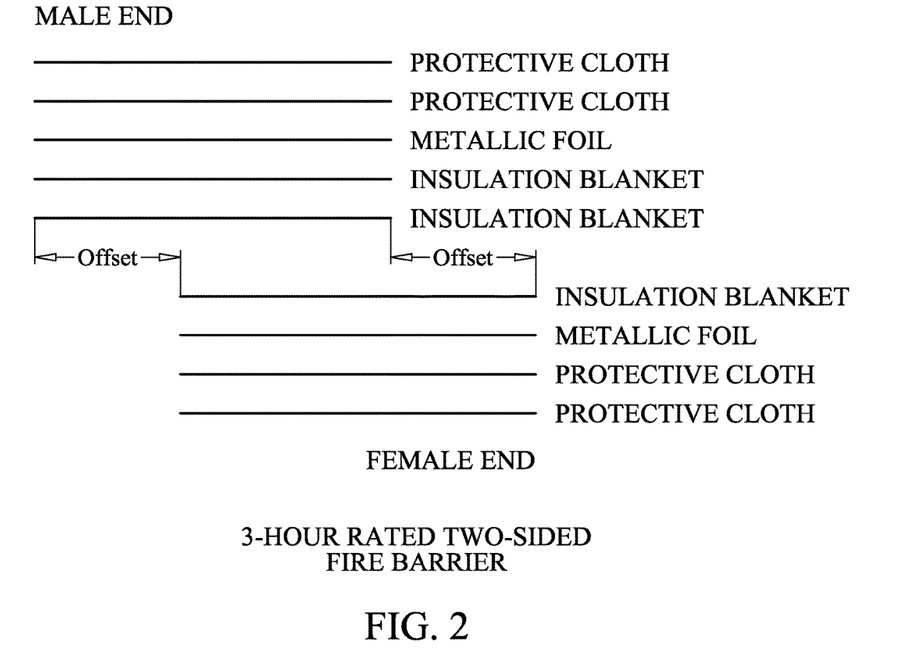
FIG. 2 is a diagrammatic cross-sectional elevational view of a 2-hour tested and rated mirrored-fire-barrier of the present invention, as illustrated in FIG. 1, illustrating the male and female connecting ends of such barriers.

FIG. 2, a diagrammatic cross-sectional elevational view, illustrates a mirrored structure of a 3-hour rated mirrored-fire-barrier of the present invention. This barrier is to be installed in a wall expansion-joint of a given width. In general, the mirrored-fire-barriers are made with male and female coupling ends as illustrated. The mirrored multi-layers of the central body of the fire-barrier (as opposed to the male and female coupling ends), as illustrated, are mirrored about a hypothetical crystallographic mirror-plane (not shown) is located within the center or innermost insulation blanket. On each side of the innermost insulation blanket is an additional blanket. In this example, each of the insulation blankets is ½ inch thick. As noted above, a 3-hour tested and rated mirrored-fire-barrier, requires at least 1½ inches of ceramic blanket. And, as mentioned above, all of the layers are cut to have the length and width that are required by the size of expansion joint into which the completed barrier is to be installed. The outer sides of each of the outer blankets is overlain by a sheet of metallic foil, which in this example is stainless steel foil, but could be of other metals. Each of the outer sides of the layers of metallic foil are overlain by a layer of protective cloth, such as Z-1105 fire-resistant fiberglass material, and each of the outer sides of the Z-1105 protective cloth are overlain by an additional layer of protective cloth, such as Z-600 fire-resistant fiberglass material. In order to create the male and female ends, each end of the barrier is offset, as shown. In this example, the offset is 12 inches to provide for male/female coupling of adjacent barriers. Both the male and the female ends will result in mirrored structures when they are interdigitated by barriers having mating ends. The mirrored-fire-barriers illustrated here are made using no glue and no intumescent material. CP25 fire caulk is used, but is applied only to the butt straight end of an installed barrier.

Figure 3:
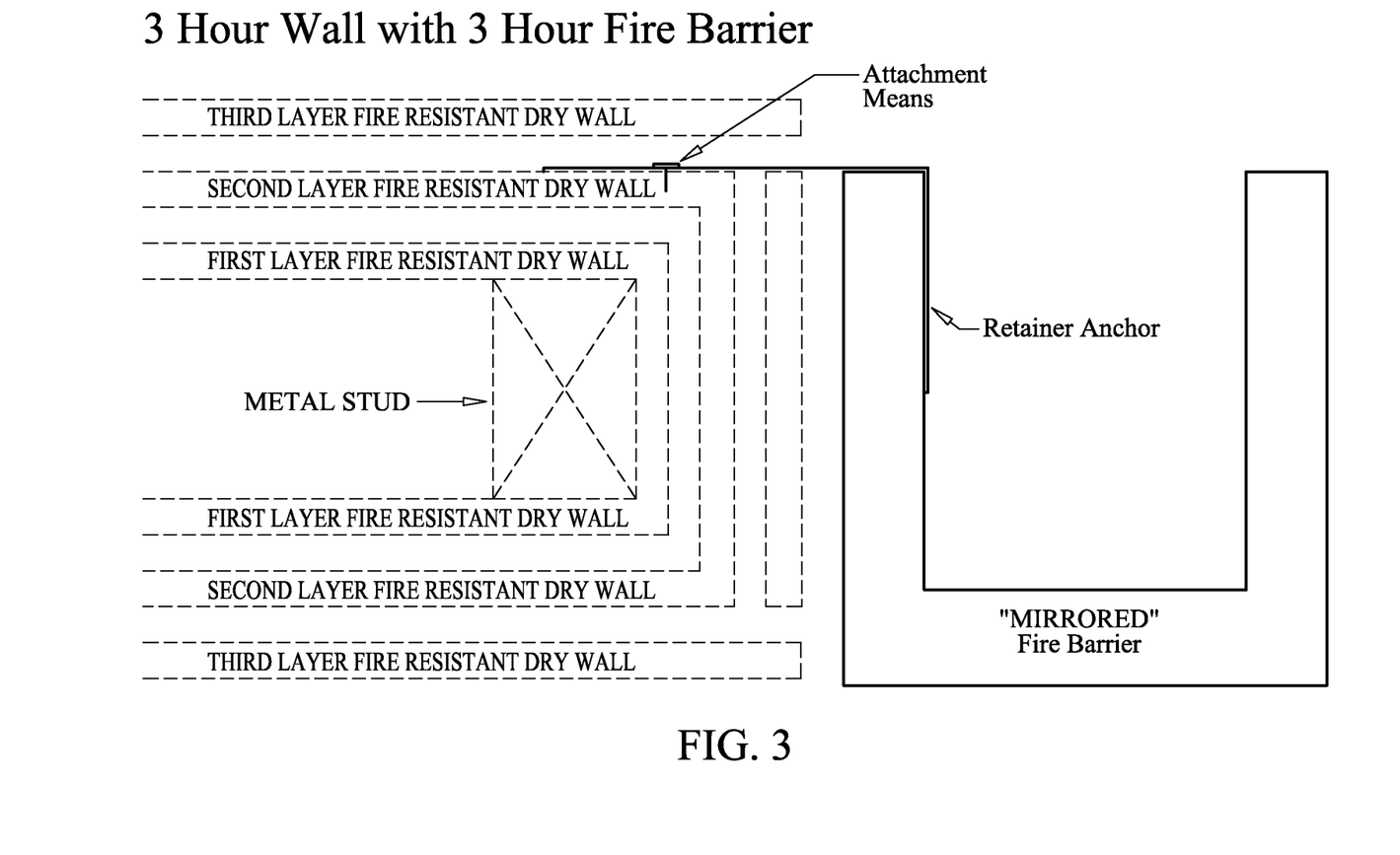
FIG. 3 is a diagrammatic cross-sectional planar view of the three-layer dry walls that require a 3-hour tested and rated two-sided or mirrored fire-barrier of the present invention to be installed in the expansion joint space.

FIG. 3, a diagrammatic cross-sectional planar view, illustrates three layers of dry wall built about a metal stud. This construction, along with a 3-hour rated fire-barrier within the expansion space, as shown, is mandated to occur at regular intervals within the wall of dry wall is required when the specifications call for protection rated for three hours. An anchoring retainer/attachment system is used to install the mirrored-fire-barriers in this example. The illustration suggests that it is a two-sided mirrored-fire-barrier that is used, however a non-mirrored fire-barrier could be used. What is required and what is contemplated by the present inventive principles is that the barrier constructed for any required use is constructed, tested, rated, and certified on both sides of the barrier. For example, for use in the expansion space illustrated in FIG. 3, the barrier could be a three hour rated barrier on one side and a four hour rated barrier on the other side. Alternatively, the barrier could three hour rated on both sides, but be made of different materials. There are many types of protective cloths, metalized foils, and ceramic insulation blankets that can be used in many different combinations. Additionally, an application of intumescent is contemplated as well as one or more layers of impermeable material that may or may not envelope part of or the entire barrier.

Figure 4:
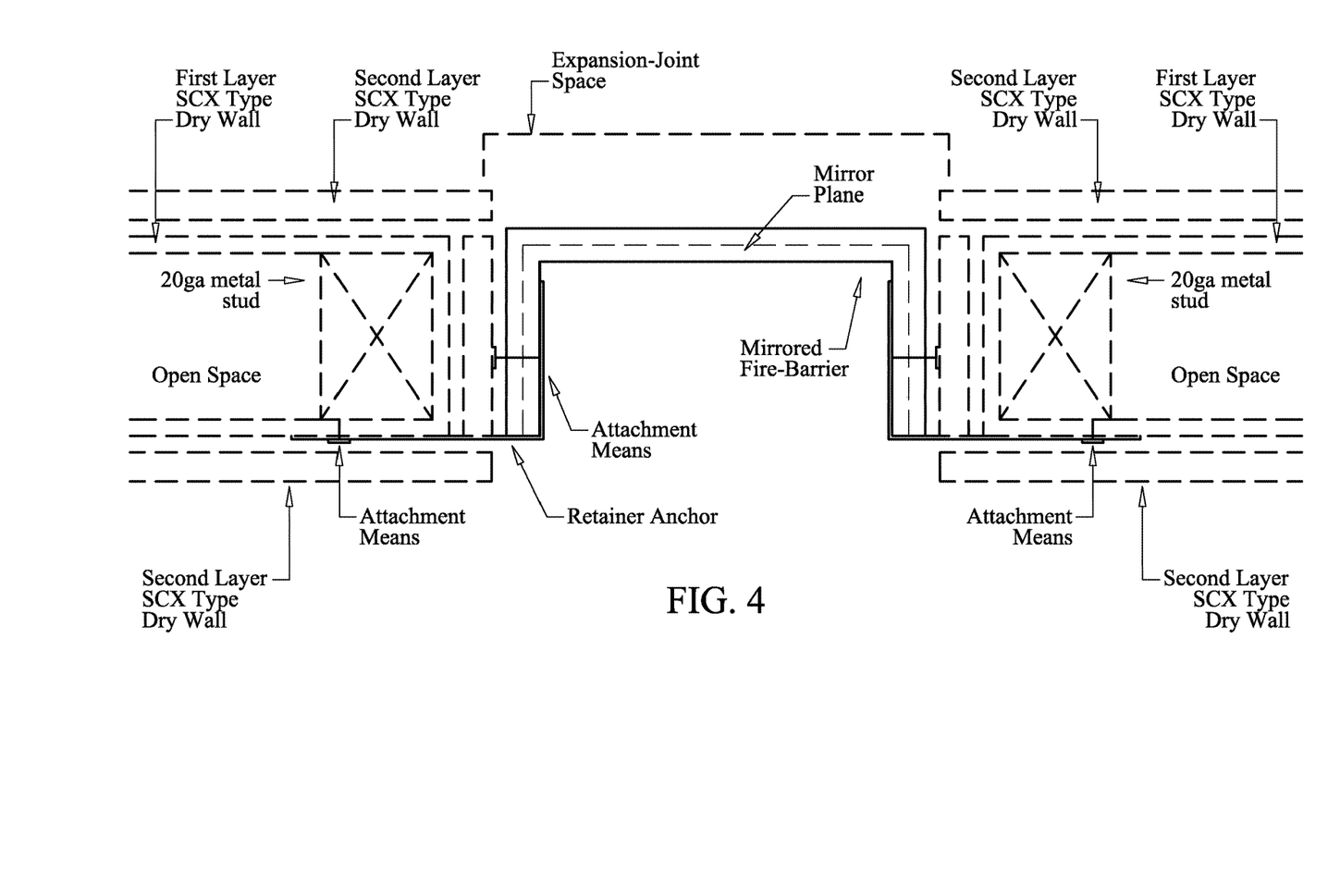
FIG. 4 is a diagrammatic cross-sectional planar view of a wall construct that requires a 2-hour tested and rated two-sided mirrored-fire-barrier of the present invention to be installed in the expansion joint space.

FIG. 4, a plan view, illustrates a planar two-sided mirrored-fire-barrier of the present invention, tested and rated for 2-hours, being installed in a wall expansion-joint space that exists between two wall segments. The layers of the mirrored-fire-barrier, in this example, could comprise, starting from the center of the barrier, two innermost layers of ½ inch ceramic blanket adjacent directly adjacent and attached to each other, with the hypothetical mirror plane situated between them, on each of the outer surfaces of the ceramic blankets there could be a layer of stainless steel foil on its outer side, with a layer of A SIL 1105 cloth following each layer of stainless steel and an outermost layer of A 600 cloth completing the mirrored layers. It is to be understood that the materials used in this example may be replaced by any other materials supplying the same function and properties. For example, there could be a single layer of thicker ceramic blanket enveloped by a layer an aluminum metalized foil, with several or one layer of protective cloth of various acceptable compositions overlying the foil. If desired, there could be an additional layer of air and water impermeable material added. In this example, the layers of one leg of the barrier and of an L-metal retainer anchor layer are attached to the wall by pins and washers inserted through all of the layers, as shown. A second leg of the L-metal retainer anchor is attached to the innermost layer of dry wall, as shown the mirrored-fire-barrier to secure the fire barrier in place. All of the two-sided and two-sided mirrored-fire-barriers made according to the principles of the present invention are contemplated to be manufactured with a retainer as part of their structure and, thus, are come from the manufacturing facility as a ready to install unit. However, if there should exist a need for an impermeable fire barrier without a retainer, that embodiment is also contemplated. In addition to a variety of layers being used to construct a two-sided or two-sided mirrored fire barrier of the present invention, the layers making up the barrier can attached to each other in various ways, such as sewing, the use of adhesive, or staples.

There are many attachment means that may be used to attach a fire-barrier to a building unit and all are contemplated for use with the present invention; examples of an attachment means used to attach a fire-barrier directly to a building unit include all mechanical fasteners, such as screws, bolts, nails, or a fire-resistant adhesive, and others. One favored embodiment uses a self-tapping screw retainer attachment means of different to attach the mirrored-fire-barrier to the building structures that define the expansion-joint space. The retainer attachment is generally fixedly attached to the mirrored-fire-barrier at the time of manufacture, but need not be so if there are unique on-site requirements. All two-sided or two-sided mirrored-barrier/retainer systems are contemplated to be fixedly mounted to a wall, such as dry wall by any desired fixation attachment means, such as by use of a nail gun to insert nails. A nail gun or nailer is a type of tool used to drive fasteners into a material that is usually driven by electromagnetism, compressed air, or, for powder-actuated tools, a small explosive charge. One example of such a nail gun is a Hilti gun that inserts fasteners through the barrier/retainer into the pre-cast concrete floor in the present example.

The threat of moisture, water, or other liquids coming into contact with a fire-barrier may be anticipated. Fire-barriers installed in hospitals, schools, sports facilities, hotels, air ports, and high-rise buildings are threatened by copious amounts of water and cleaning chemicals used for cleaning purposes, especially for floor cleaning, on a daily or even more frequent basis. Another example would be fire-barriers installed in public facilities, such as open-air stadiums that are regularly subjected to the effects of rain and snow. As mentioned above, once a fire-barrier becomes wet, it no longer retains its certification, even if it is dried because it is apt to fail in a fire. Fire-barrier failure in any of these facilities is likely to result in unnecessary hazards to life and to facility. The importance of correctly designed, installed, tested, and maintained fire-barriers is increasingly recognized by building officials, owners, insurance companies, contractors, and the public. Thus, the barriers of the present invention are manufactured with one or both sides completely protected from the effects of moisture. An impermeable membrane is fixedly attached to one side of the barrier, or so that the membrane completely encapsulates the barrier. When fire-barriers are installed into expansion joint spaces in floors or ceilings, the barrier is styled to droop between the two building structures to which it is attached. The drape provides give and take when the building is subjected to compressional and tensional motion. If moisture and/or water do collect in the lowest surface area of the U-shaped, draped barrier, in addition to being protected by the presence of an impermeable membrane covering, a drain throughout the barrier may be provided to ensure that any collected liquid gets drained. Any liquid that collects on the inner surface of the inner multi-layer, i.e., on the exposed surface of the impermeable layer, will gravity drain through an aperture that is functionally positioned through the surface of the impermeable layer at the lowest depression of the u-shaped fire-barrier. The liquid will drain through the aperture into and through plastic drainage tubing, which emanates from the aperture, through the barrier, to hang out the lower outer surface of the barrier. Because this tubing is plastic that would quickly be affected by heat and other environmental conditions, it is protected by being positioned within outer tubing flexible metal fire-resistant tubing. After passing through the length of the metal tubing, a length of the plastic tubing emanates out of metal fire-resistant tubing. Liquid traveling through the tubings will eventually be collected by fluid catchment means. Therefore, a drain system comprises plastic tubing emanating from the inner aperture through the entire thickness of moisture impermeable mirrored-fire-barrier to extend outside of the outer aperture to the outermost layer of the fire-barrier. Impermeability is maintained by caulking the join between the inner surface of the barrier and the tubing with impermeable caulk material. Impermeable fire-resistant caulk material is used to seal the join between the outer surface of the barrier and the tubing. Plastic tubing extends from the outside of the barrier to be securely covered by flexible, fire-resistant, metal tubing. Intumescent caulking is inserted into the space between the outer surface of plastic tubing and the inner surface of metal tubing. In the event of a fire, the intumescent caulking will expand. The metal tubing will force the expansion of the intumescent caulking toward the plastic tubing which will cause the tubing to collapse upon itself and, thus, create a seal preventing fire, smoke, and gases from getting through the barrier.

Wherever fire-barriers are required in expansion joint spaces that occur in floors or ceilings, the design of the building will dictate whether the barrier will have to be attached on the upper most surfaces of the structure units bounding the expansion joint space, on the side walls of the structure units bounding the joint space, or on the bottom surface of the structure units. This is likely to happen when the structural units are prefabricated cements pads that are of a minimal thickness. Note that by being mounted below the floor, there is adequate space in the expansion joint for a required rubber boot to be installed within the expansion space. In each of these instances, a two-sided or two-sided mirrored-fire-barrier could be required.

The foregoing description, for purposes of explanation, uses specific and defined nomenclature to provide a thorough understanding of the invention. However, it will be apparent to one skilled in the art that the specific details are not required in order to practice the invention. The disclosed descriptions and illustrations are not intended to be exhaustive or to limit the invention to the precise forms disclosed. Those skilled in the art will recognize that many changes may be made to the features, embodiments, and methods of making the versions of the invention described herein without departing from the spirit and scope of the invention, such as adjusting the numbers and kinds of layers shown in the drawings and described above to fit the variety of other similar, but different, expansion joints, such as the geometrically complex intersection expansion joints created upon the intersection of two or more expansion joint spaces. Furthermore, the present invention is not limited to the described methods, embodiments, features or combinations of features but include all the variation, methods, modifications, and combinations of features within the scope of the appended claims. The invention is limited only by the claims.

What is claimed is:

1. A fire barrier, comprising:
a two-sided fire barrier having each of its two sides defined as a section,
each of said sections including:
an outer section having an outer-most layer and
an inner section common to both of said outer sections,
said outer-most layer consisting of one or more protective cloth layers, said one or more protective cloth layers being a woven fabric heat-resistant to 2000 degrees F.,
wherein each of said two outer sections further comprises one or more layers of metallic foil,
said inner section comprising one or more ceramic insulation blanket layers,
with each of said two sides equally fully fire barrier functional.

2. The fire barrier, as recited in claim 1, wherein each of said two sides fully fire barrier functional means that said fire barrier is configured to have both of its said two sides meet the requirements of 2010 listed ASTM 1399"cycle" test and UL 2079"fire" or "burn" test.

3. The fire barrier, as recited in claim 1, wherein said inner section comprises one or more layers of ceramic insulation blanket with each of said one or more insulation blankets being ½ inch thick.

4. The fire barrier, as recited in claim 1, wherein one or more of said layers of metallic foil is aluminum foil.

5. The fire barrier, as recited in claim 1, wherein each of its two outer sections comprises one or more moisture impermeable layers.

6. The fire barrier, as recited in claim 1, further comprising barrier to barrier male/female end connections.

7. The fire barrier, as recited in claim 1, wherein said fire barrier is a wall fire barrier fitting the full area between the walls separating two different environments.

8. A fire barrier, comprising:
a first ceramic blanket layer;
a second ceramic blanket layer;
a first metallic foil layer, the first ceramic blanket layer being located between the first metallic foil layer and the second ceramic blanket layer;
a second metallic foil layer, the second ceramic blanket layer being located between the first ceramic blanket layer and the second metallic foil layer;
a first protective cloth layer, the first metallic foil layer being located between the first ceramic blanket layer and the first protective cloth layer; and
a second protective cloth layer, the second metallic foil layer being located between the second ceramic blanket layer and the second protective cloth layer.

9. The fire barrier, as recited in claim 8, the first ceramic blanket layer, the first metallic foil layer, and the first protective cloth layer forming a first side;
the second ceramic blanket layer, the second metallic foil layer, and the second protective cloth layer forming a second side;
the fire barrier being fully fire barrier functional, fire barrier functional meaning that said fire barrier is configured to have both of said two sides meet the requirements of 2010 listed ASTM 1399 "cycle" test and UL 2079 "fire" or "burn" test; and
wherein the fire barrier is a 2-hour rated fire barrier.

10. The fire barrier of claim 8, further comprising a third protective cloth layer, the first protective cloth layer being located between the first metallic foil layer and the third protective cloth layer and a fourth protective cloth layer, the second protective cloth layer being located between the second metallic foil layer and the fourth protective cloth layer.

11. The fire barrier, as recited in claim 10, wherein one or both of said first and second metallic foil layers is aluminum foil.

12. The fire barrier, as recited in claim 8, further comprising barrier to barrier male/female end connections.

13. The fire barrier of claim 8 further comprising one or more moisture impermeable layers.

14. The fire barrier, as recited in claim 8, wherein said fire barrier is a wall fire barrier.

15. A fire barrier, comprising:
a first ceramic blanket layer;
a second ceramic blanket layer;
a first metallic foil layer, the first ceramic blanket layer being located between the first metallic foil layer and the second ceramic blanket layer;
a second metallic foil layer, the second ceramic blanket layer being located between the first ceramic blanket layer and the second metallic foil layer;
a first protective cloth layer, the first metallic foil layer being located between the first ceramic blanket layer and the first protective cloth layer; and
a second protective cloth layer, the second metallic foil layer being located between the second ceramic blanket layer and the second protective cloth layer, wherein the first ceramic blanket layer and the second ceramic blanket layer are in direct contact.

16. A fire barrier, comprising:
a two-sided fire barrier defined by two sections, each section having an
outer section, and
an inner section,
said outer sections bounding said inner section common to each of said outer sections;
with each section fully fire barrier functional,
said two outer sections each having an outer-most layer consisting of one or more protective cloth layers, said one or more protective cloth layers being a woven fabric heat-resistant to 2000 degrees F.,
said inner section comprising one or more layers of ceramic insulation blanket, and
said two outer sections additionally comprising one or more layers of metallic foil.

17. The fire barrier, as recited in claim 16, further with each of said two sections fully fire barrier functional, fire barrier functional meaning that said fire barrier is configured to have both of said two sides meet the requirements of 2010 listed ASTM 1399 "cycle" test and UL 2079 "fire" or "burn" test.

* * * * *